United States Patent [19]

Wilbourn et al.

[11] Patent Number: 5,623,042

[45] Date of Patent: Apr. 22, 1997

[54] PROCESS FOR REDUCING TRACE LEVELS OF METALLIC IMPURITIES IN CYCLIZED POLYISOPRENE RESIN

[75] Inventors: Keith O. Wilbourn, Matthews, N.C.; James M. Davidson, Corydon, Ind.; Richard W. Roberts, Guston, Ky.

[73] Assignee: Olin Corporation, Cheshire, Conn.

[21] Appl. No.: 504,213

[22] Filed: Jul. 19, 1995

[51] Int. Cl.⁶ ............................................. C08C 2/04
[52] U.S. Cl. ..................... 528/486; 528/498; 528/499
[58] Field of Search .......................... 526/486, 498, 526/499

[56] References Cited

U.S. PATENT DOCUMENTS

| | | | |
|---|---|---|---|
| 2,865,874 | 12/1958 | Hyman et al. | 260/29.3 |
| 3,067,172 | 12/1962 | Iugmar | 260/60 |
| 3,432,453 | 3/1969 | Gladney et al. | 260/29.3 |
| 4,033,909 | 7/1977 | Papa | 260/2.5 |
| 4,725,523 | 2/1988 | Miura et al. | 430/192 |
| 5,073,622 | 12/1991 | Wojtech et al. | 528/486 |
| 5,075,193 | 12/1991 | Dresely et al. | 430/169 |
| 5,080,997 | 1/1992 | Hioki et al. | 430/168 |
| 5,116,715 | 5/1992 | Roland et al. | 430/190 |
| 5,378,802 | 1/1995 | Honda | 528/480 |

FOREIGN PATENT DOCUMENTS

| | | |
|---|---|---|
| 259458 | 4/1989 | Czechoslovakia . |
| 0251187A2 | 1/1988 | European Pat. Off. . |

OTHER PUBLICATIONS

Perry's Chemical Engineers' Handbook, 6th Ed., 1984, McGraw-Hill, NY, NY, pp. 19-63 1984.

*Primary Examiner*—Thomas R Weber
*Attorney, Agent, or Firm*—William A. Simons; Todd E. Garabedian

[57] ABSTRACT

A process for reducing trace levels of metallic impurities in cyclized polyisoprene resin is disclosed. The process reduces trace levels of metallic impurities in cyclized polyisoprene resin by washing an impure organic solvent/cyclized polyisoprene resin solution at least once with a heated aqueous acidic solution, and subsequently washing the resin at least once with heated water.

8 Claims, No Drawings

PROCESS FOR REDUCING TRACE LEVELS OF METALLIC IMPURITIES IN CYCLIZED POLYISOPRENE RESIN

BACKGROUND OF THE INVENTION

1. Field of the Invention

A process for reducing trace levels of metallic impurities in cyclized polyisoprene resin by washing an impure organic solvent/cyclized polyisoprene resin solution first at least once with a heated aqueous acidic solution and subsequently washing at least once with heated water.

2. Brief Description of Prior Art

The microelectronics industry requires that all materials used in a manufacturing environment be extremely clean with respect to trace metals. These metals, when present, are very harmful to the performance of microelectronic devices.

Cyclized polyisoprenes are used as a major ingredient in negative-making photoresists. These are conventionally made by cyclizing polyisoprene in an organic solvent (e.g., xylene) using a Lewis acid catalyst in a stainless steel reactor. Generally, a dilute polyisoprene resin solution [e.g., 10% by weight solids in the organic solvent (e.g., xylene)] is charged into the reactor. The Lewis acid catalyst dissolved that organic solvent (e.g., $BF_3$ etherate in xylene) is then charged to the reactor. The resulting reaction cyclizes the polymer as well as decreases the viscosity of the solution. The viscosity of the reaction solution is monitored until a desired value is reached; at this time, a quenching agent (e.g., methanol or water) is added to the reaction solution to slow down or stop the cyclization reaction. After the quench, the solution is warmed until the quenching agent can be removed by vacuum stripping. This vacuum proceeds until the quenching agent is removed from the reaction solution. Optionally, a portion of the remaining organic solvent may be stripped further from the cyclized polyisoprene solution to produce a final solution having the desired solids content.

The above process has certain deficiencies associated with it. The Lewis acid catalyst has the tendency to generate protons that may corrode the reactor surfaces as well as the other metallic materials involved in the process (e.g., column condensers). This undesirable corrosion may import high concentrations of trace metals into the final cyclized polyisoprene resin solution. In addition, the presence of any remaining Lewis acid catalyst trace impurities in the final product can cause undesirable further cyclization reactions which may cause a drift in the product's properties and the final resist's properties over time.

Accordingly, there is a need for removing trace levels of such metallic impurities and any additional Lewis acid catalyst impurities from a cyclized polyisoprene resin solution without significantly altering the fundamental properties of the resin. The present invention answers that need.

BRIEF SUMMARY OF THE INVENTION

Accordingly, the present invention is directed to a process for reducing the level of trace metal impurities in cyclized polyisoprene resin, comprising the steps of:

(1) dissolving impure cyclized polyisoprene resin containing a trace amount of metallic impurities in at least one organic solvent, thereby forming an impure organic solvent/cyclized polyisoprene solution;

(2) contacting said impure organic solvent/cyclized polyisoprene resin with an aqueous acidic solution for a sufficient amount of time at a temperature of about 40° C. to about 100° C., thereby forming a first two-phase mixture comprising an first aqueous phase containing metallic impurities extracted from said impure organic solvent/cyclized polyisoprene solution and a first organic phase containing cyclized polyisoprene resin solution with a reduced amount of metallic impurities;

(3) separating said first aqueous phase from said first organic phase;

(4) contacting said separated first organic phase with water for a sufficient amount of time at a temperature of about 40° C. to about 100° C., thereby forming a second two-phase mixture comprising a second aqueous phase containing metallic impurities extracted from said first organic phase and a second organic phase containing cyclized polyisoprene resin with a further reduced amount of metallic impurities; and (5) separating said second aqueous phase from said second organic phase, thereby forming a pure organic solvent/cyclized polyisoprene resin solution.

DESCRIPTION OF THE PREFERRED EMBODIMENTS

The term "impure organic solvent/cyclized polyisoprene resin solution" as used in the present specification and claims refers to solutions containing more than 1 ppm total metallic impurities.

The term "pure organic solvent/cyclized polyisoprene resin solution" as used in the present specification and claims refers to solutions containing less than 0.5 ppm total metallic impurities.

The impure organic solvent/cyclized polyisoprene solution to be treated by the process of the present invention preferably has a solids content from about 7% to about 20% by weight, more preferably about 9% to about 16% by weight. The dissolving step (1) of the present invention may occur either during the cyclization reaction or subsequent thereto.

Generally, this impure solution contains at least one part per million (ppm) by weight total trace metallic impurities. Usually, these may range from about 2 to about 10 ppm of total trace metal impurities. The metallic impurities may be in the form of monovalent metal cations such as alkali metals (e.g. $Na^+$ and $K^+$) as well as divalent and trivalent cations (e.g. $Ca^{+2}$, $Fe^{+2}$, $Fe^{+3}$, $Cr^{+3}$, and $Zn^{+2}$). Such metal impurities may also be in the form of colloidal particles such as insoluble colloidal iron hydroxides and oxides. Among these metals, iron is the most common with sodium, calcium, zinc, chromium, copper, nickel, magnesium, manganese, and others also sometimes being present.

The impure solution is contacted with at least one heated aqueous acidic solution. Generally, the acid may be a chelating acid or an inorganic acid or mixtures thereof. Examples of chelating acids include oxalic acid and lactic acids. Any organic acids with a β-diketone group that will chelate metals to some degree is suitable for use in this problem. Examples of inorganic acids are hydrochloric acid, sulfuric acid, nitric acid, and the like. Any inorganic acid which can form organic insoluble, water-soluble salts of metal ions may be suitable for use in this process. The more preferable inorganic acids are those having more organic-insoluble salts.

The amount of acid in the aqueous acid solution is preferably less than 10% by weight, more preferably from about 0.01% to about 7% by weight and more preferably from about 0.05% to about 4% by weight.

The relative amounts of organic solvent and water in the aqueous acidic contacting or washing step may be from 90:10 parts to 50:50 parts by volume; preferably from 80:20 parts to 70:30 parts by volume.

This aqueous acid wash or washes may be carried out in any suitable apparatus, including the reactor in which the polyisoprene was cyclized. Generally, the aqueous acidic solution is added to the organic solvent/cyclized polyisoprene solution and the resulting mixture is agitated for a sufficient amount of time to obtain a thorough mixing of the two solutions (e.g., from 15 to 120 minutes). The mixture is then allowed to sit for a sufficient time (e.g., from 30 to 120 minutes) to form a two-phase mixture with the organic solvent layer on top and water layer on the bottom. The water layer is then preferably drained from the bottom leaving a partially pure organic solvent/cyclized polyisoprene solution (i.e., first organic phase).

This aqueous acid contacting or washing step may be repeated more than once, if desired. After the aqueous acid wash or washes, the organic solvent/cyclized polyisoprene solution is subjected to at least one heated water wash.

The heated water contacting or washing step is preferably carried out in the same heated apparatus as the aqueous acid contacting step. A suitable amount of water is added to the heated apparatus containing the organic solvent/cyclized polyisoprene solution and the resulting mixture is agitated for a sufficient amount of time to obtain a thorough mixing of the water with the organic solvent solution (e.g., from 15 to 120 minutes). The mixture is then allowed to sit for sufficient time (e.g., from 15 to 120 minutes) to form a two-phase mixture with the organic solvent layer on top and the water layer on top. Then, the water layer is separated by removing the water from the apparatus.

The relative amounts of the separated first organic phase and water in this heated water contacting or washing step may be from 90:10 parts to 50:50 parts by volume; preferably from 80:20 parts to 70:30 parts by volume.

This water contacting or washing step may be repeated more than once. Each heated water contacting step is carried out at a temperature above room temperature. Temperatures from about 40° C. to about 100° C. are suitable.

After the separation of the last second aqueous phase, the resulting pure organic solvent/cyclized polyisoprene solution may still contain small amounts of water dissolved therein. This residual water may be removed by any conventional means. Preferably, this is carried out by vacuum stripping. Any suitable temperature/pressure combination where the water is vaporized off with a small portion of the organic solvent may be used for this optional vacuum stripping step. Temperatures in the range from about 60° C. to about 100° C. at a vacuum from about 5 mm Hg to about 600 mm Hg may be preferred.

The resulting pure organic solvent/cyclized polyisoprene solution may then be used as a component in a negative photoresist.

The present invention is further described in detail by means of the following Examples and Comparisons. All parts and percentages are by weight and all temperatures are degrees Celsius unless explicitly stated otherwise.

Comparison 1

Oxalic Acid Wash at Room Temperature Without Water Wash

Trace metals removal was attempted on a 10% by weight cyclized rubber solution of cyclized polyisoprene and xylene. 500 ml of the solution was introduced into a 1000 ml glass separatory funnel. 100 ml of 7% (wt.) aqueous (low metal content deionized water) oxalic acid solution was added and the mixture was shaken vigorously for 5 minutes (at room temperature). The mixture was allowed to stand for one hour and the aqueous (bottom) layer was then removed.

After as much of the acidic deionized water solution was removed as was feasible, the remaining organic solvent solution was introduced into a distillation vessel fitted with the appropriate column, and the remaining water was stripped. Some xylene was also azeotroped off, so after all water was removed, xylene was added back to the solution to make the volume back up to what it was originally.

The original solution and the washed solution were analyzed with the following results:

| Unwashed Sample | 2.3 ppm Iron |
| Washed Sample | 1.8 ppm Iron |

EXAMPLE 1

Aqueous Oxalic Acid Wash at 70° C. Followed by Two Water Washes at 70° C.

Cyclized rubber solution similar to that in Comparison 1 was washed with the same aqueous acidic and water solutions in a 1,000 ml glass reactor fitted with a glass stirring rod and a tempered water jacket.

Specifically, the same 500 ml cyclized rubber solution and 100 ml of the same 7% aqueous oxalic acid solution were mixed at 70° C. until stabilized; the mix was then agitated further for 30 minutes. As above, the solution was allowed to phase separate for one hour.

The separated organic phase was then subjected to two deionized water washings (100 ml). Each washing step included agitation for 30 minutes at 70° C. Each formed two-phase mixture was allowed to phase separate for 30 minutes before the aqueous phase was drained off the bottom of the reactor. After the last heated water washing, the remaining water was stripped off as in Comparison 1. Xylene was then again added to the reactor to make up the original volume.

The original solution and the washed solution were analyzed with the following results:

| Unwashed Sample | 2.3 ppm Iron |
| Washed Sample | <0.1 ppm Iron |

While the invention has been described above with reference to specific embodiments thereof, it is apparent that many changes, modifications, and variations can be made without departing from the inventive concept disclosed herein. Accordingly, it is intended to embrace all such changes, modifications, and variations that fall within the spirit and broad scope of the appended claims. All patent applications, patents, and other publications cited herein are incorporated by reference in their entirety.

What is claimed is:

1. A process for reducing the level of trace metal impurities in cyclized polyisoprene resin, comprising the steps of:
   (1) dissolving impure cyclized polyisoprene resin containing a trace amount of metallic impurities in at least one organic solvent thereby forming an impure organic solvent/cyclized polyisoprene solution;

(2) contacting said impure organic solvent/cyclized polyisoprene resin with an aqueous acidic solution for a sufficient amount of time at a temperature of from about 40° C. to about 100° C., thereby forming a first two-phase mixture comprising an first aqueous phase containing metallic impurities extracted from said impure organic solvent/cyclized polyisoprene and an organic phase containing cyclized polyisoprene resin with a reduced amount of metallic impurities;

(3) separating said first aqueous phase from said first organic phase;

(4) contacting said separated first organic phase with water for a sufficient amount of time at a temperature of about 40° C. to about 100° C., thereby forming a second two-phase mixture comprising a second aqueous phase containing metallic impurities extracted from said first organic phase and a second organic phase containing cyclized polyisoprene resin with a further reduced amount of metallic impurities; and (5) separating said second aqueous phase from said second organic phase, thereby forming a pure organic solvent/cyclized polyisoprene resin solution.

2. The process of claim 1 wherein said acid in said aqueous acid solution is oxalic acid.

3. The process of claim 1 including, after said step (5), vacuum stripping said separated second organic phase to remove residual amounts of water.

4. The process of claim 1 wherein said organic solvent is xylene.

5. The process of claim 1 wherein the amount of acid in said aqueous acidic solution is from about 0.01% to about 7% by weight of said aqueous acidic solution.

6. The process of claim 5 wherein the amount of acid in said aqueous acidic solution is from about 0.05% to about 4% by weight of said aqueous acidic solution.

7. The process of claim 1 wherein the relative amounts of organic solvent and water in said aqueous acidic solution in step (2) is from about 90:10 parts to 50:50 parts by volume.

8. The process of claim 1 wherein the relative amounts of separated first organic phase and water in said aqueous solution in step (4) is from about 90:10 parts to 50:50 parts by volume.

* * * * *